(12) United States Patent
Loudermilk et al.

(10) Patent No.: US 10,967,299 B2
(45) Date of Patent: Apr. 6, 2021

(54) VACUUM WASTE REMOVAL SYSTEM

(71) Applicant: Grant Weaver, Groton, CT (US)

(72) Inventors: Andrew S. Loudermilk, Kalispell, MT (US); Grant Weaver, Groton, CT (US)

( * ) Notice: Subject to any disclaimer, the term of this patent is extended or adjusted under 35 U.S.C. 154(b) by 0 days.

(21) Appl. No.: 15/950,694

(22) Filed: Apr. 11, 2018

(65) Prior Publication Data

US 2018/0290075 A1  Oct. 11, 2018

Related U.S. Application Data

(60) Provisional application No. 62/484,038, filed on Apr. 11, 2017.

(51) Int. Cl.
| | | |
|---|---|---|
| *B01D 21/18* | (2006.01) | |
| *B01D 17/04* | (2006.01) | |
| *B01D 17/02* | (2006.01) | |
| *B01D 21/24* | (2006.01) | |
| *B01D 21/06* | (2006.01) | |
| *B01D 21/30* | (2006.01) | |
| *C02F 1/40* | (2006.01) | |
| *C02F 101/32* | (2006.01) | |

(52) U.S. Cl.
CPC ........ *B01D 17/044* (2013.01); *B01D 17/0211* (2013.01); *B01D 21/06* (2013.01); *B01D 21/18* (2013.01); *B01D 21/2427* (2013.01); *B01D 21/2438* (2013.01); *B01D 21/30* (2013.01); *C02F 1/40* (2013.01); *C02F 2101/32* (2013.01); *C02F 2201/008* (2013.01); *C02F 2209/02* (2013.01)

(58) Field of Classification Search
CPC .. B01D 17/044; B01D 21/06; B01D 21/2427; B01D 21/30; B01D 17/0211; B01D 21/18; B01D 21/2438
See application file for complete search history.

(56) References Cited

U.S. PATENT DOCUMENTS

| | | | | |
|---|---|---|---|---|
| 2,881,923 A | * | 4/1959 | Nelson | B03D 1/04 |
| | | | | 210/525 |
| 3,011,643 A | * | 12/1961 | McCoy | B01D 24/004 |
| | | | | 210/167.13 |
| 3,267,909 A | * | 8/1966 | McClanahan | F24H 1/165 |
| | | | | 122/250 R |

(Continued)

FOREIGN PATENT DOCUMENTS

| | | | | |
|---|---|---|---|---|
| JP | 08099084 A | * | 4/1996 | |
| KR | 797564 B1 | * | 1/2008 | |

*Primary Examiner* — Chester T Barry
(74) *Attorney, Agent, or Firm* — Steven M. McHugh; TCORS

(57) ABSTRACT

A scum removal system for use with a wastewater treatment clarification tank containing wastewater is provided and includes a debris intake conduit, a debris discharge conduit, and a pump article. The pump article is configured to be in flow communication with the debris intake conduit and the debris discharge conduit, wherein the pump article and debris intake conduit are configured to generate a suction within the debris intake conduit and wherein the debris intake conduit is configured to be located proximate the wastewater. Additionally, the debris intake conduit is sloped downwardly at a debris intake conduit angle β, and the second discharge conduit is sloped downwardly at a debris discharge conduit angle Ω.

19 Claims, 11 Drawing Sheets

(56) References Cited

U.S. PATENT DOCUMENTS

| | | | | | |
|---|---|---|---|---|---|
| 3,490,081 | A | * | 1/1970 | Ogden | E04H 4/1209 |
| | | | | | 4/510 |
| 3,556,301 | A | * | 1/1971 | Smith | E02B 15/06 |
| | | | | | 210/242.3 |
| 3,760,944 | A | * | 9/1973 | Bell | E02B 15/106 |
| | | | | | 210/110 |
| 4,613,415 | A | * | 9/1986 | Wreath | C02F 1/4674 |
| | | | | | 204/263 |
| 5,453,179 | A | * | 9/1995 | Stultz | B01D 21/0003 |
| | | | | | 210/97 |
| 5,481,789 | A | * | 1/1996 | Thomas | B01D 21/06 |
| | | | | | 29/426.5 |
| 2014/0342437 | A1 | * | 11/2014 | Carpenter | C12N 1/20 |
| | | | | | 435/252.4 |
| 2017/0235318 | A1 | * | 8/2017 | Bright | G05D 9/12 |
| | | | | | 137/2 |

* cited by examiner

VACUUM WASTE REMOVAL SYSTEM

RELATED APPLICATIONS

This application is related to and claims the benefit of priority of U.S. Provisional Patent Application Ser. No. 62/484,038, filed Apr. 11, 2017, the contents of which are incorporated by reference herein in its entirety.

FIELD OF THE INVENTION

The present invention relates generally to scum removal in a wastewater treatment facility and more particularly to a vacuum device that removes liquid, solid and semi-solid material from the top of waste water tanks and channels.

BACKGROUND OF THE INVENTION

Wastewater treatment plants are well known and are used to treat wastewater to remove contaminants, such as household sewage, from the wastewater to create an environmentally safe effluent. This environmentally safe effluent may then be released into a larger body of water or used for other purposes, such as irrigation or groundwater recharge. As is known, the treatment of wastewater generally involves three (3) stages and includes a primary stage, a biological secondary stage and a clarification stage. In the primary stage, the wastewater is received and stored in a quiescent tank where the heavy solids are allowed to settle on the bottom of the tank, while the oil, grease and lighter solids float to the surface. The heavier materials are then removed as sludge. The lighter solids, oil and grease, also called scum, are collected and removed and the remaining liquid is generally applied to the biological stage for further purification. During biological treatment, wastewater pollutants are removed from the water by bacteria and other microbes.

Clarification immediately follows biological treatment, during which clarified water passes under a scum baffle, over a weir, and is discharged from the wastewater treatment facility. During clarification the majority of the bacteria settle to the bottom of the clarifier tank where they are collected and pumped back to the biological tank. However, some of the bacteria, along with lighter solids float on the surface of the effluent contained within the clarifier quiescent tank. These bacteria and lighter solids are continually driven and directed into a hopper, or scum pit, where the bacteria and lighter solids are collected and then pumped to a sludge treatment facility for further processing. One such type of clarifier system used for clarification is a referred to as a circular clarifier and has a center well and a scum arm. The scum arm, which extends across the diameter of the quiescent tank and slowly rotates about the center well and around the radius of the tank, is partially located within the effluent such that a portion of the scum arm is protruding from the surface of the effluent. As the arm rotates, the scum arm contacts and directs any floating debris, plus other scum, leaves, and waste that either form on the surface of the clarifier or that is deposited there to a scum skimmer which entraps the floating debris and deposits the floating debris into a scum pit for removal to the sludge processing equipment.

Unfortunately however, the scum and other floating debris (including plastic, paper, organic materials, and inorganic matter) tends to accumulate in the center well and frequently develops into an odorous crust of material and other debris. This odorous crust must then be removed via a water spray, which is typically a manually operated fire hose that is traditionally used to break up the debris crust and cause the floating debris to exit the center well by passing through one or more outlet ports in the center well wall. This is undesirable because the development of the odorous crust requires personnel to manually remove the odorous crust which increases operation costs and processing time.

SUMMARY OF THE INVENTION

A scum removal system for use with a wastewater treatment clarification tank containing wastewater is provided, wherein the wastewater includes a wastewater surface having floating debris. The scum removal system includes a debris intake conduit, wherein the debris intake conduit defines a first intake opening, a second intake opening and an intake conduit cavity, wherein the first intake opening is communicated with the second intake opening via the intake conduit cavity, a debris discharge conduit, wherein the debris discharge conduit defines a first discharge opening, a second discharge opening and a discharge conduit cavity, wherein the first discharge opening is communicated with the second discharge opening via the discharge conduit cavity. The scum removal system also includes a pump article, wherein the pump article includes a pump intake port in flow communication with the debris intake conduit and a pump discharge port in flow communication with the debris discharge conduit, wherein the pump article and debris intake conduit are configured to generate a suction at the first intake opening and wherein the debris intake conduit is configured so that the second intake opening is located proximate the wastewater surface. Additionally, the second intake opening is located at a height that is lower than the pump article such that at least a portion of the debris intake conduit is sloped at a debris intake conduit angle β between the pump article and the second intake opening, and wherein the second discharge opening is located at a height that is lower than the pump article such that at least a portion of the debris discharge conduit is sloped at a debris discharge conduit angle Ω between the pump article and the second discharge opening.

A scum removal system for use with a wastewater treatment clarification tank containing wastewater is provided and includes a debris intake conduit, a debris discharge conduit, and a pump article. The pump article is configured to be in flow communication with the debris intake conduit and the debris discharge conduit, wherein the pump article and debris intake conduit are configured to generate a suction within the debris intake conduit and wherein the debris intake conduit is configured to be located proximate the wastewater. Additionally, the debris intake conduit is sloped downwardly at a debris intake conduit angle β, and the second discharge conduit is sloped downwardly at a debris discharge conduit angle Ω.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

Figure 1:
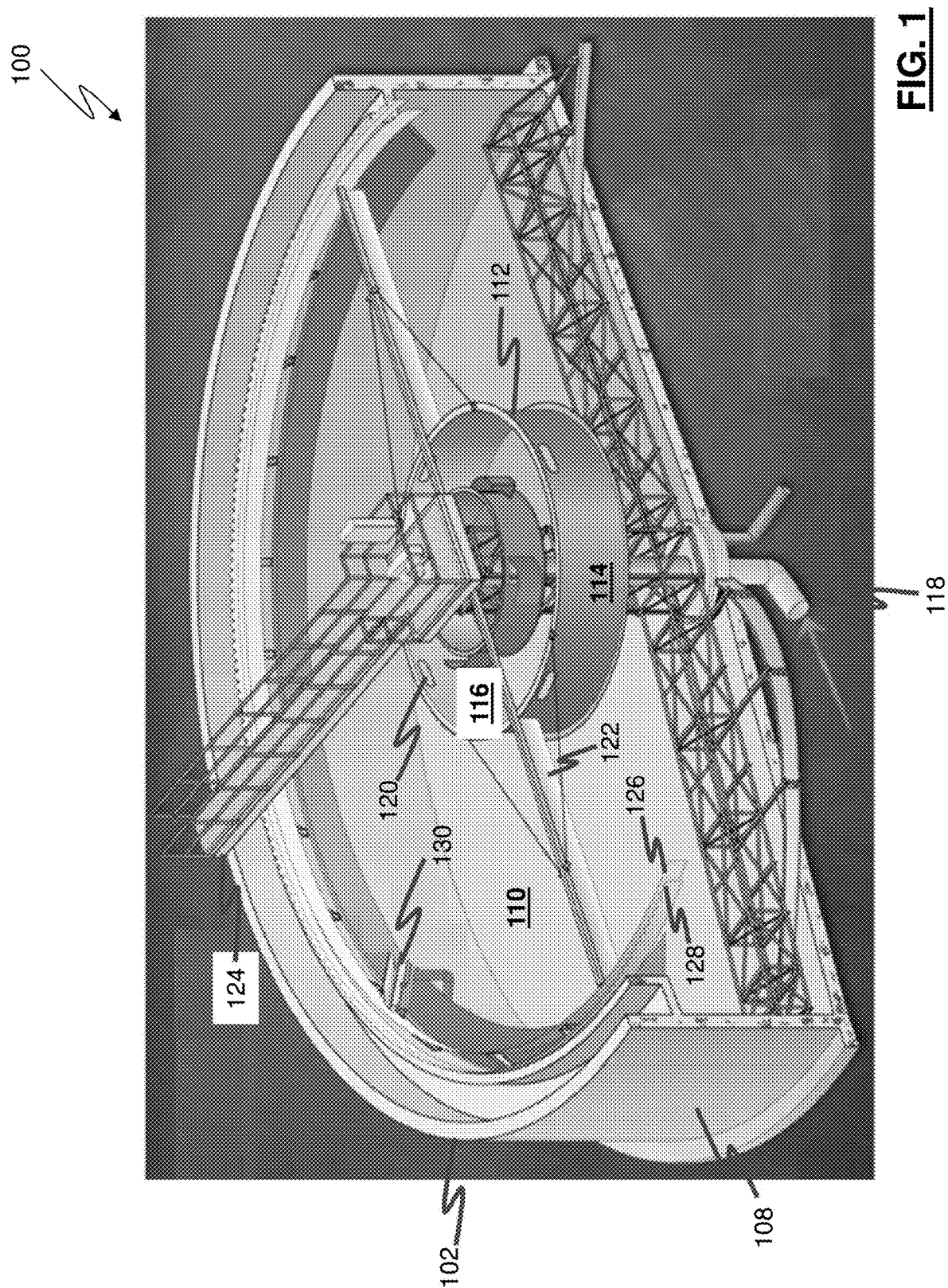
FIG. 1 is a top down sectional view of a clarifier tank, in accordance with the prior art.
Figure 2:
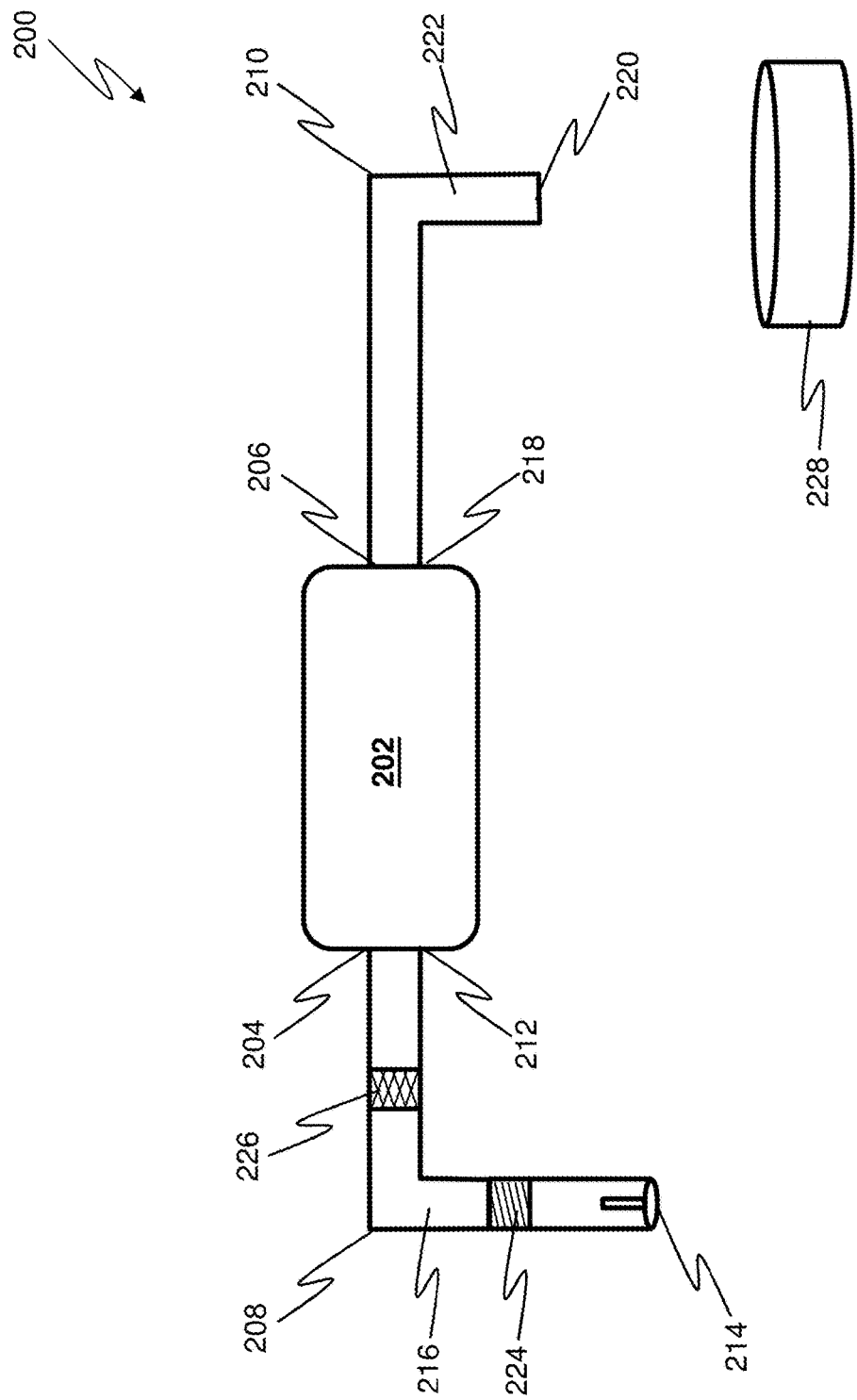
FIG. 2 is a block diagram of a scum removal for use with the clarifier tank of FIG. 1, in accordance with one embodiment of the invention.

Referring to FIG. 1 and FIG. 2, a scum removal system 200 for use with a clarification quiescent tank, or clarifier tank, 102 of a wastewater treatment system 100 is disclosed, wherein the scum removal system 200 is configured to collect and remove floating material and other debris that is floating on the surface of wastewater contained within the clarification quiescent tank 102. The clarifier tank, 102 includes a tank wall 108 which defines a quiescent tank cavity, or main cavity, 110 for containing partially treated wastewater and a center well 112 having a center well wall 114 which defines a center well cavity 116 communicated with the main cavity 110. The clarifier tank 102 includes an inlet 118 for receiving and depositing untreated wastewater having impurities, such as solid/semi-solid particulate matter and other impurities (oil, grease, etc.), into the center well cavity 116. The center well wall 114 is configured with one or more center well wall openings 120 to allow the impurities to slowly flow from the center well cavity 116 into the main cavity 110.

The clarifier tank 102 includes a skimmer arm 122 which extends across the radius of the main cavity 110 between the tank wall 108 and the center well wall 114, wherein the skimmer arm 122 is configured to rotate about the center well 112 and around the main cavity 110. Additionally, the clarifier tank 102 typically includes a platform 124 which allows an attendant to walk between the center well 112 and the tank wall 108. It should be appreciated that as the skimmer arm 122 rotates around the main cavity 110, the skimmer arm 122, which extends partially below the surface of the wastewater, acts to direct the impurities floating on the surface of the wastewater to flow toward the tank wall 108, wherein the tank wall 108 includes a scum baffle 126 having a v-notch weir 128 and a trough or channel 130 which collects the impurities and directs the collected impurities into a collection tank (not shown). It should be appreciated that water is clarified in the main cavity 110, passes under the scum baffle 126, over the weir 128, and into the effluent trough or channel 130.

In accordance with one embodiment of the invention, referring again to FIG. 2, the scum removal system 200 for collecting scum and debris from the clarifier tank 102 is shown, wherein the scum removal system 200 includes a pump article 202 having a pump intake opening 204 and a pump discharge opening 206. The scum removal system 200 further includes an intake pipe 208 and a discharge pipe 210, wherein the intake pipe 208 defines an intake pipe first opening 212, an intake pipe second opening 214 and an intake pipe cavity 216. It should be appreciated that the intake pipe first opening 212 is communicated with the intake pipe second opening 214 via the intake pipe cavity 216. Additionally, the discharge pipe 210 defines a discharge pipe first opening 218, a discharge pipe second opening 220 and a discharge pipe cavity 222, wherein the discharge pipe first opening 218 is communicated with the discharge pipe second opening 220 via the discharge pipe cavity 222. It should also be appreciated that the intake pipe first opening 212 is configured to be in flow communication with the pump intake opening 204 and the discharge pipe first opening 218 is configured to be in flow communication with the pump discharge opening 206.

The scum removal system 200 may further include a flexible coupling 224 and/or a filtering/screening device 226, wherein the flexible coupling 224 is configured to be in-line with the intake pipe 208 such that a portion of the intake pipe 208 is movably configurable. Moreover, the filtering/screening device 226 may also be in-line with the intake pipe 208 (such as a 2 inch diameter pipe with a flexible coupling affixed to the catwalk of a secondary wastewater clarifier) to filter out debris large enough to damage or prevent the pump article 202 from operating. It should be appreciated that in at least one embodiment, the scum removal system 200 may be mobile so that it may be located at various locations respective to the quiescent tank 102, such as on the platform 124. While in another embodiment, the scum removal system 200 may be fixed proximate the center well 112. When the pump article 202 is operated, the pump article 202 may create a suction present at the intake pipe first opening 212. As such, wastewater material is directed into the intake pipe first opening 212 via the suction and will flow through the intake pipe 208. The wastewater material will encounter the filtering/screening device 226 and the larger contaminants will be filtered out of the wastewater material. The filtered wastewater material will then be pumped through the pump article 202, through the discharge pipe 210 and out of the discharge pipe second opening 220 into a collection device 228. It should be appreciated that the intake pipe 208 may be configurably movable to allow the intake pipe second opening 214 to be located at different locations.

Figure 3:
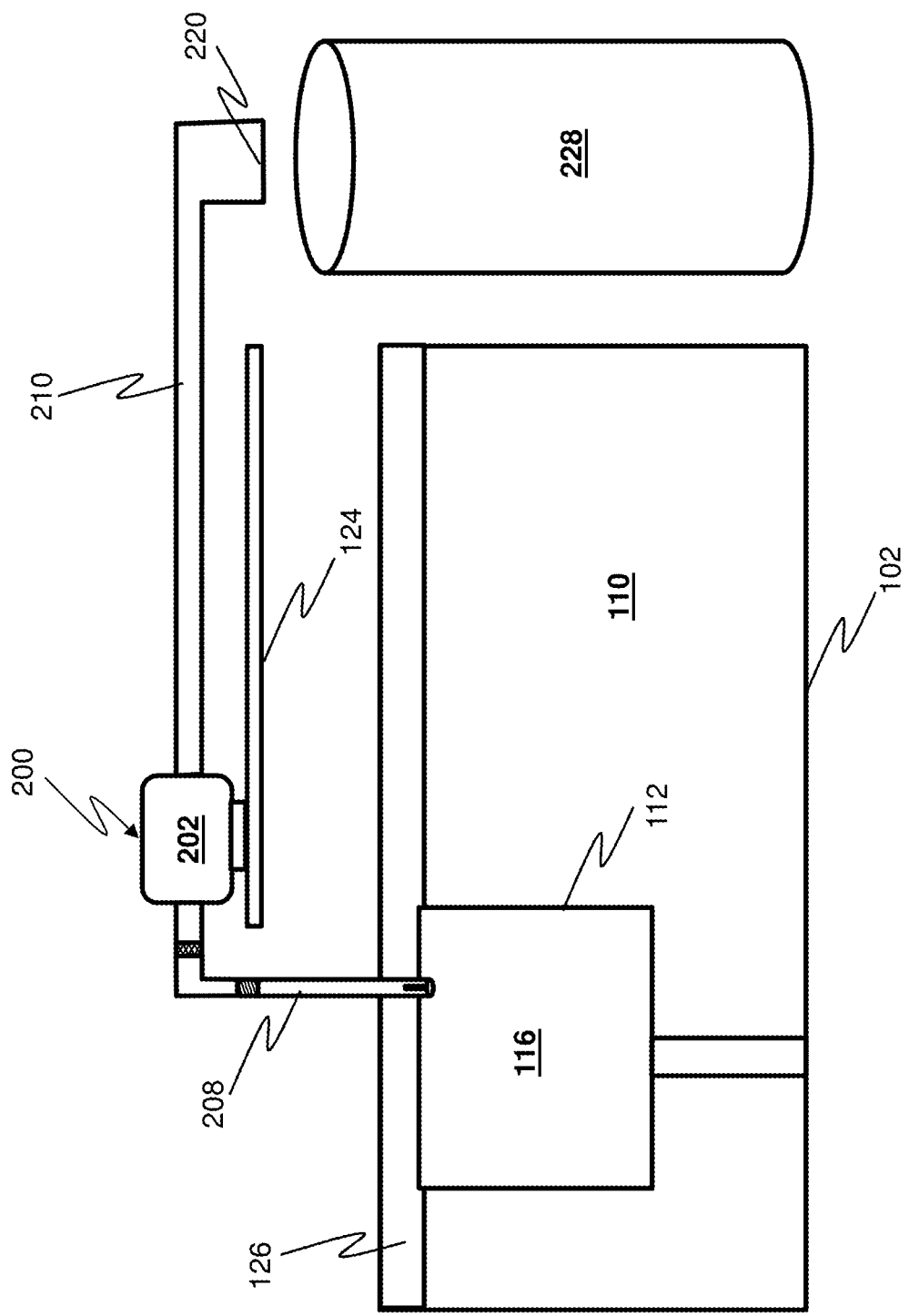
FIG. 3 is a side view of the scum removal system of FIG. 2 associated with the clarifier tank of FIG. 1, in accordance with one embodiment of the invention.

Referring to FIG. 3, in one embodiment the scum removal system 200 may be associated with the platform 124 to be located proximate the center well 112, wherein the intake pipe 208 is configured such that the intake pipe second opening 214 is in proximity to the surface of the wastewater contained in the center well cavity 116. This advantageously allows the pump article 202 to remove the scum, i.e. lighter particulates, sludge, oil, grease, etc. that is floating on top of the wastewater contained in the center well cavity 116. As discussed above, the scum that is sucked up into the pump article 202 flows through the intake pipe 208, into and through the pump article 202 into the discharge pipe 210, out of the discharge pipe second opening 220 and into a collection tank 228.

In one embodiment, the scum removal system 200 may be a fixed device for removing scum and other floating debris from the surface of a liquid by passing the material through a pump article 202 and conveying the material to a collection device 226 that may be open to the atmosphere. The pump system 200 may include a filter, screen, or other device to collect large particles prior to entry into the pump article 202. It is contemplated that the pump article 202 may be a pump which operates with a high enough RPM to provide a sufficient vacuum but with sufficient inefficiencies in the rotor/casing assembly to allow water and debris to pass through without plugging. It should be appreciated that the pump article 202 may be any pumping device suitable to the desired end purpose, such as a rotary lobe pump, a direct-drive centrifugal-fan pump or a double diaphragm pump operating at sufficient speed to pull adequate vacuum and/or another type of mechanical system that pulls a vacuum to sufficient to move a combination of air, water, scum, and debris via suction.

Figure 4:
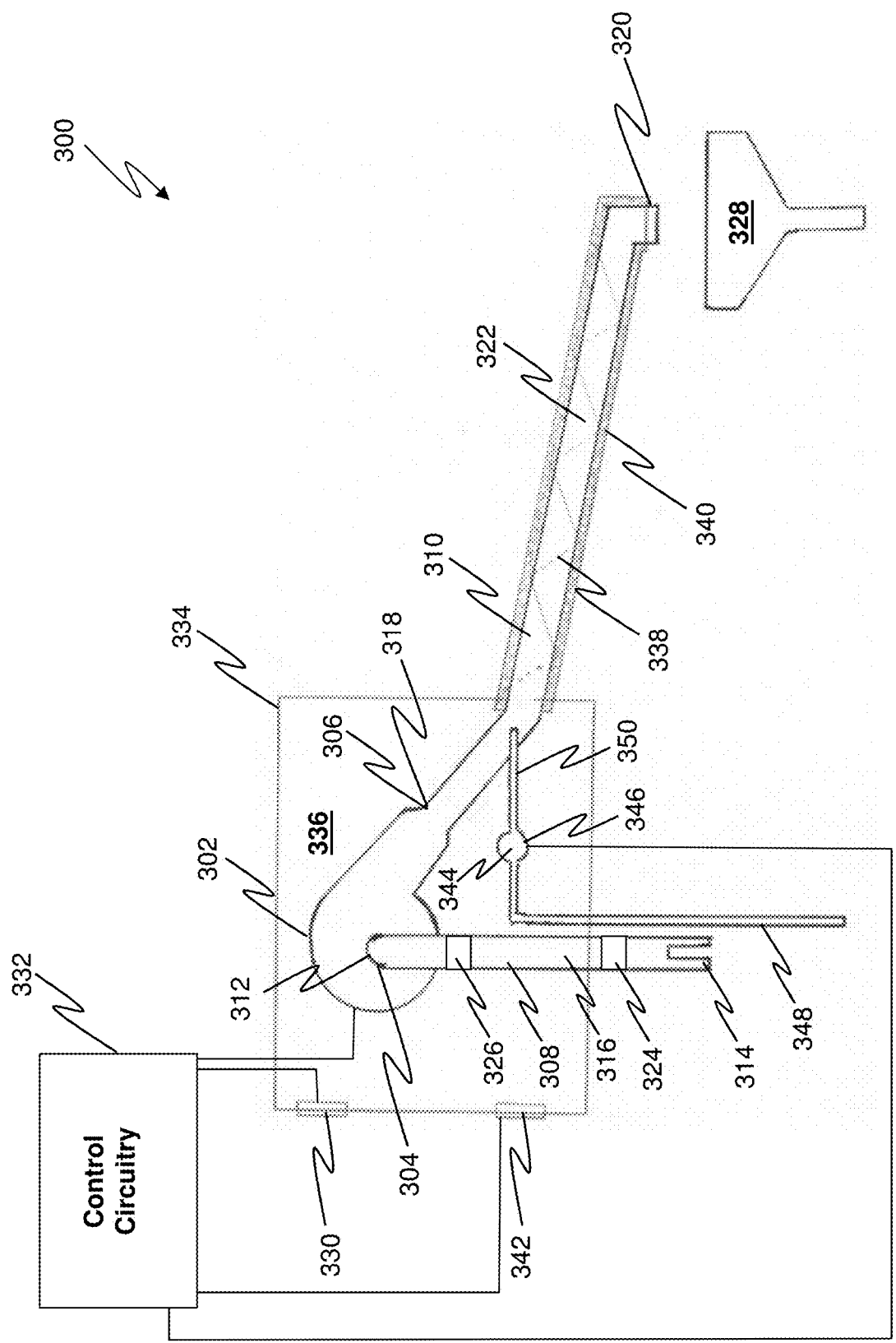
FIG. 4 is a block diagram of a scum removal system for use with the clarifier tank of FIG. 1, in accordance with another embodiment of the invention.

In accordance with another embodiment of the invention, referring to FIG. 4, a scum removal system 300 is provided for collecting scum and debris from a clarifier tank 102 and includes a pump article 302 having a pump intake opening 304 and a pump discharge opening 306. The scum removal system 300 further includes an intake pipe 308 and a discharge pipe 310, wherein the intake pipe 308 defines an intake pipe first opening 312, an intake pipe second opening 314 and an intake pipe cavity 316. It should be appreciated that the intake pipe first opening 312 is communicated with the intake pipe second opening 314 via the intake pipe cavity 316. Additionally, the discharge pipe 310 defines a discharge pipe first opening 318, a discharge pipe second opening 320 and a discharge pipe cavity 322, wherein the discharge pipe first opening 318 is communicated with the discharge pipe second opening 320 via the discharge pipe cavity 322. It should also be appreciated that the intake pipe first opening 312 is configured to be in flow communication with the pump intake opening 304 and the discharge pipe first opening 318 is configured to be in flow communication with the pump discharge opening 306.

The scum removal system 300 may further include a flexible coupling 324 and/or a filtering/screening device 326, wherein the flexible coupling 324 is configured to be in-line with the intake pipe 308 such that a portion of the intake pipe 308 is movably configurable. Moreover, the filtering/screening device 326 may also be in-line with the intake pipe 308 (such as a 2 inch diameter pipe with a flexible coupling affixed to the catwalk of a secondary wastewater clarifier) to filter out debris large enough to damage or prevent the pump article 302 from operating. It should be appreciated that in at least one embodiment, the scum removal system 300 may be mobile so that it may be located at various locations respective to the quiescent tank 102, such as on the platform 124. While in another embodiment, the scum removal system 300 may be fixed proximate the center well 112 or on the side of the clarifier tank 102. When the pump article 302 is operated, the pump article 302 creates a suction present at the intake pipe first opening 312 and intake pipe second opening 314. As such, wastewater material is directed to flow into the intake pipe second opening 314, through the intake pipe cavity 316 and through the intake pipe first opening 312 via the suction produced by the pump article 302. The wastewater material may encounter the filtering/screening device 326 and the larger contaminants may be filtered out of the wastewater material flowing through the intake pipe 308. The filtered wastewater material will then be pumped through the pump article 302, out of the pump discharge opening 306, into the discharge pipe first opening 318, through the discharge pipe 310 and out of the discharge pipe second opening 320 into a collection device 328. It should be appreciated that the intake pipe 308 proximate the intake pipe first opening 312 may be configurably movable to allow the intake pipe second opening 314 to be located at different locations.

The scum removal system 300 may further include a heating system 330, a processing device 332 and/or a pump enclosure 334, wherein the pump enclosure 334 defines an enclosure cavity 336. It should be appreciated that at least a portion of the pump 302 may be located within the enclosure cavity 336 and the heating system 330 may be configured to deliver heat to the enclosure cavity 336. This advantageously keeps the pump 302, at least a portion of the intake pipe 308 and at least a portion of the discharge pipe 310 heated so that fluid and material flowing through the pump 302, intake pipe 308 and discharge pipe 310 doesn't freeze during colder weather. Additionally, the discharge pipe 310 and/or intake pipe 308 may also include a heating element 338 (such as heat tape or a heating wire) that is wrapped around at least a portion of the discharge pipe 310 and the discharge pipe 310 and/or intake pipe 308 may also be covered with an insulating material 340. This advantageously helps to prevent the fluid and other material flowing through the exposed portion of the discharge pipe 310 and/or intake pipe 308 from freezing.

It should be appreciated that the heating system 330 may include a temperature sensing device configured to monitor the temperature of the enclosure cavity 336, the intake pipe 308 and/or the discharge pipe 310. Moreover, the processing device 332 may be in signal communication with the heating system 330 to receive signals from the temperature sensing device and control the heating system 330 in response. Additionally, the pump enclosure 334 may include an exhaust port and/or an exhaust fan 342 which may also be in signal communication with and/or controlled by the processing device 332. Furthermore, the scum removal system 300 may include a flushing system 344 which may include a flush pump 346, a flush intake pipe 348 and a flush discharge pipe 350, wherein the flush discharge pipe 350 is in flow communication with the discharge pipe 310 such that fluid flowing out of the flush discharge pipe 350 will flow into and through at least a portion of the discharge pipe 310. The flush intake pipe 348 is in flow communication with a fluid source and the flush discharge pipe 350 such that when the flush pump 346 is operated, fluid flows from the fluid source, into the flush intake pipe 348, out of the flush discharge pipe 350 and into the discharge pipe 310. This advantageously helps to remove debris which may be built up and located within the discharge pipe 310 and may also act to prevent buildup of such debris within the discharge pipe 310 and/or flush the contents of collection device 328.

It should be appreciated that the processing device 332 may be in hard wired and/or wireless signal communication with the pump article 302, the exhaust fan 342, the heating system 330, the heating element 338 and/or the flush pump 346 such that the processing device 332 may control the operation of the pump article 302, the exhaust fan 342, the heating system 330, the heating element 338 and/or the flush pump 346. Moreover, it should be appreciated that the arrangement of the heating system 330 and exhaust fan/vent 342 may have any configuration as suitable to the desired end purpose. For example, in one embodiment the heating system 330 may be located proximate the bottom of the pump enclosure 334 and the fan/vent 342 may be located proximate the top of the pump enclosure 334. It should be further appreciated that any pump article 202, 302 suitable to the desired end purpose may be used. For example, in one embodiment, one such pump article 202, 302 may be a pumping device having a rotary lobe positive displacement blower with a scarified cast iron housing and ground cast iron lobes with a 2" suction inlet (blower air intake), a 2" discharge outlet (blower air outlet) and a 5 HP, 3-phase motor. As another example, in another embodiment, another such pump article 202, 302 may be a pumping device having a centrifugal fan pump with a 2-inch inlet, a 3 inch discharge connection and a 2 HP, single phase, 110V 3600 RPM direct drive motor.

Figure 5:
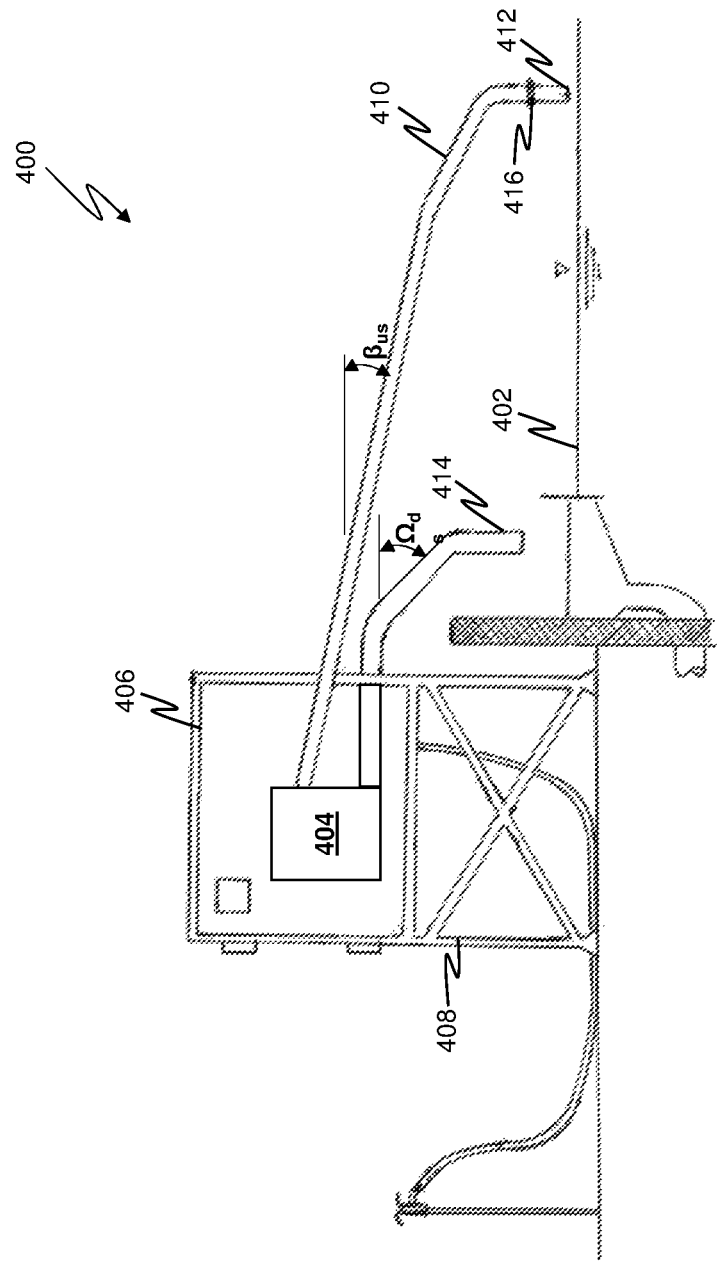
FIG. 5 is a side view of a scum removal system, in accordance with one embodiment of the present invention.
Figure 6:
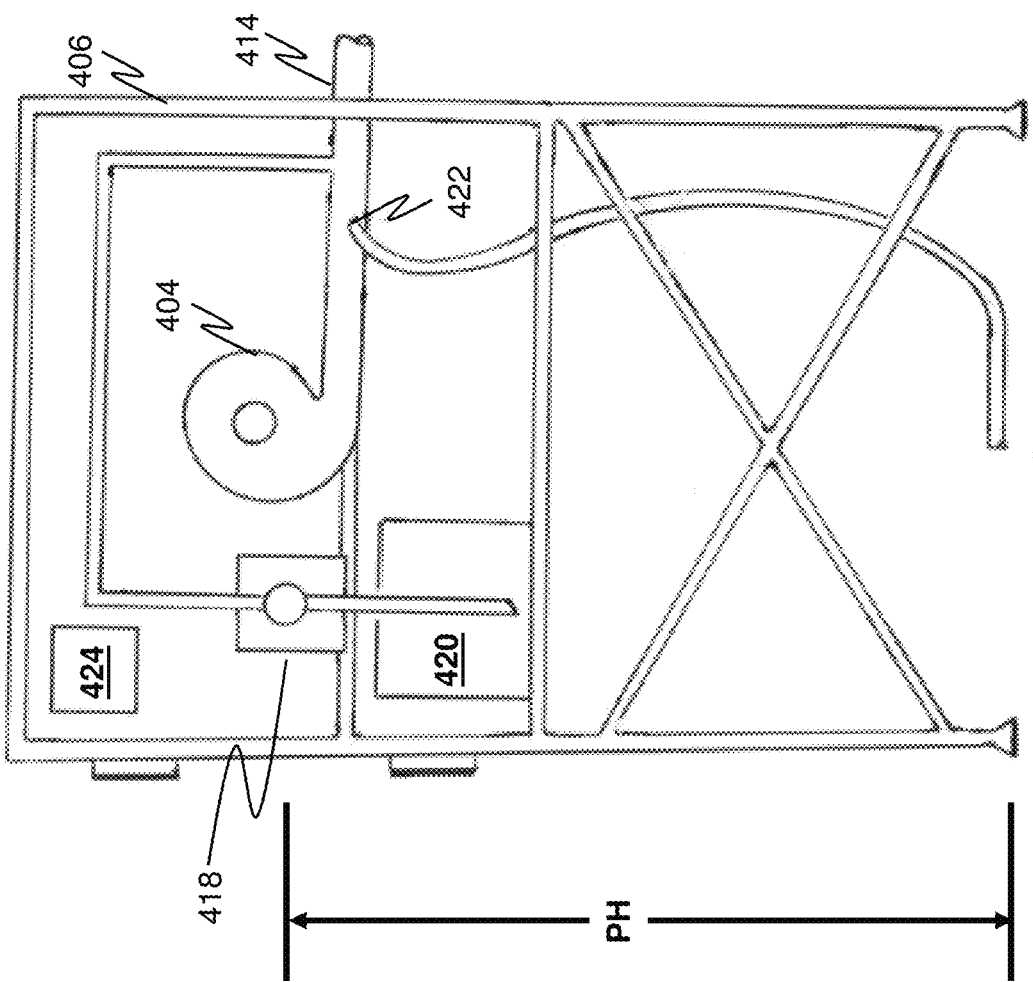
FIG. 6 is a side view of a cabinet for a scum removal, in accordance with one embodiment of the invention.
Figure 7:
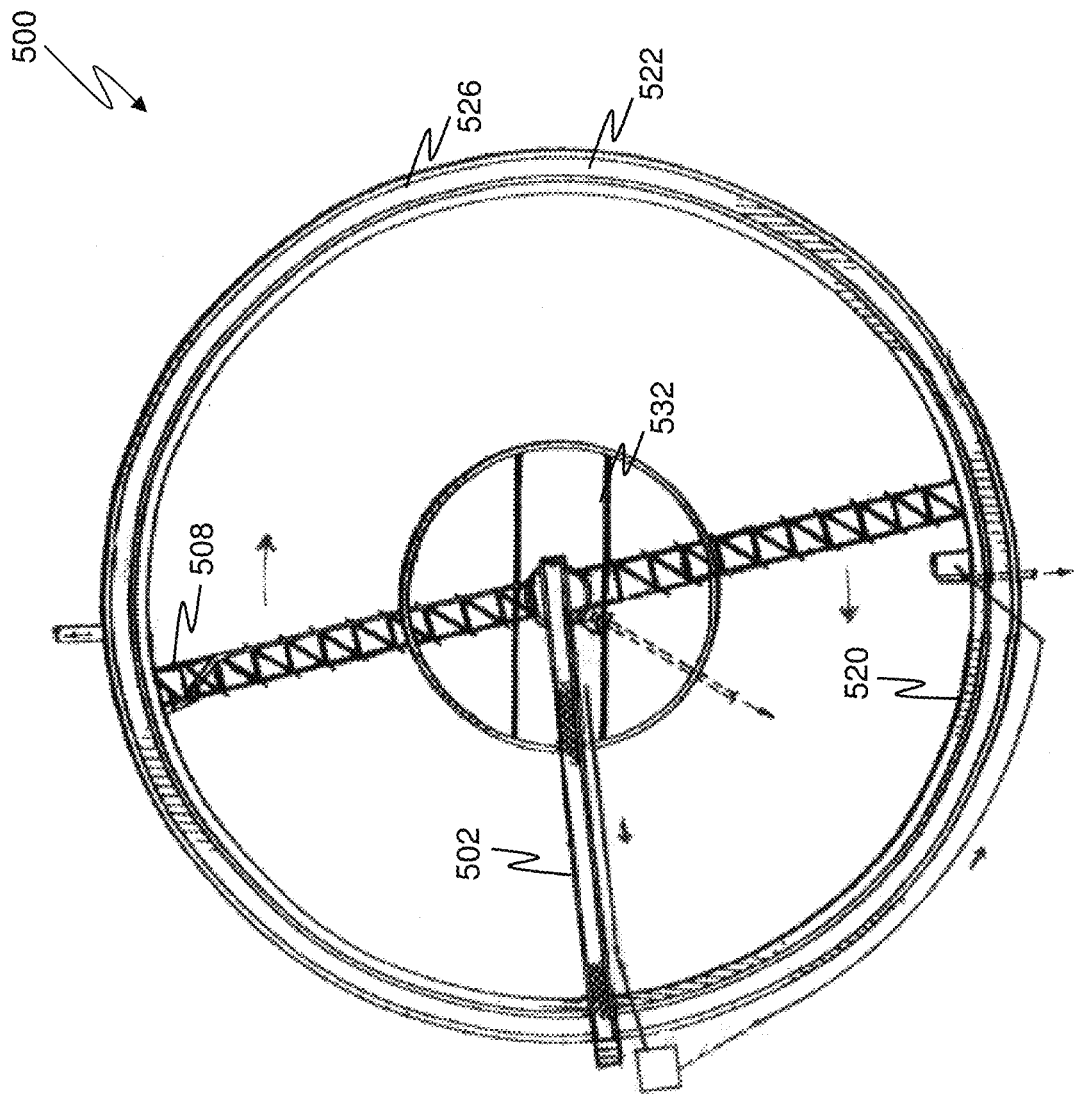
FIG. 7 is a top down view of a circular clarifier tank for use with the scum removal system of the present invention.
Figure 8:
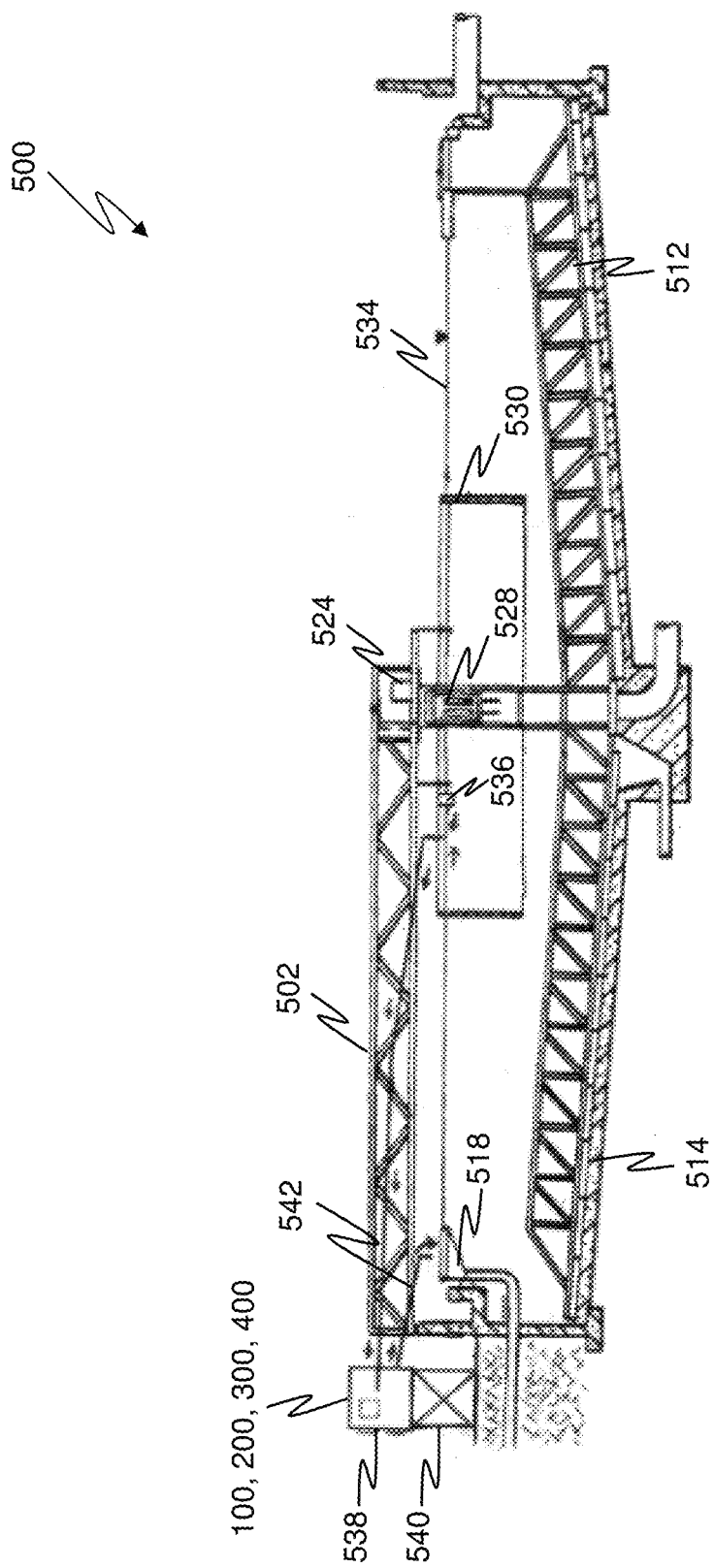
FIG. 8 is a side sectional view of a circular clarifier tank for use with the scum removal system of the present invention.
Figure 9:
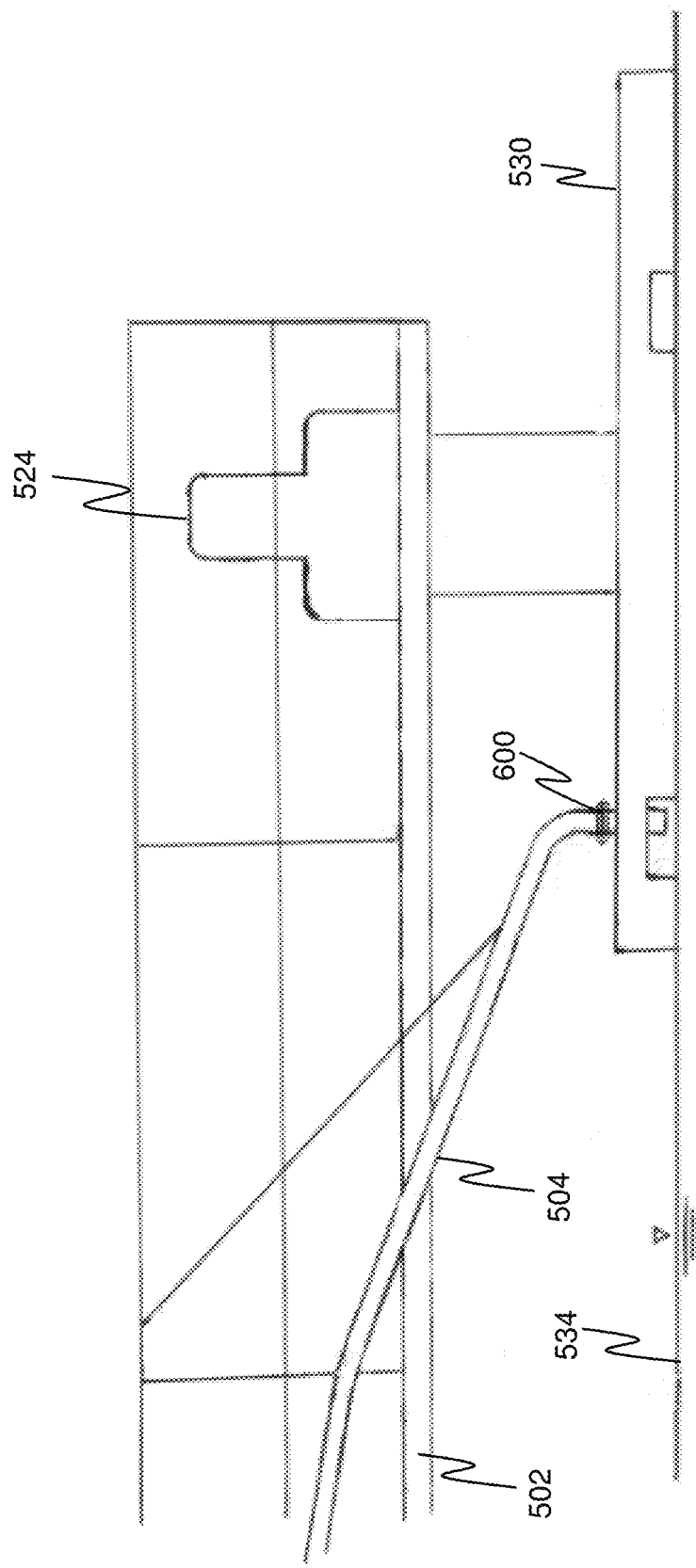
FIG. 9 is an enlarged side view of a circular clarifier tank for use with the scum removal system of the present invention.
Figure 10B:
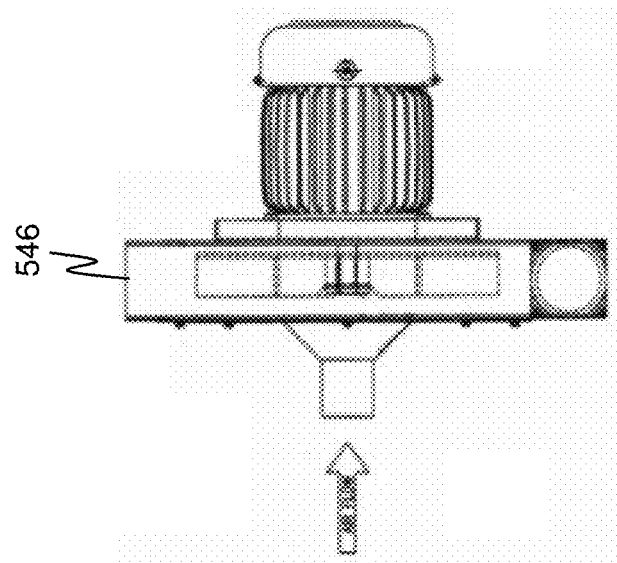
FIG. 10B is a side sectional view of one embodiment a pump for use with the scum removal system of the present invention.
Figure 10A:
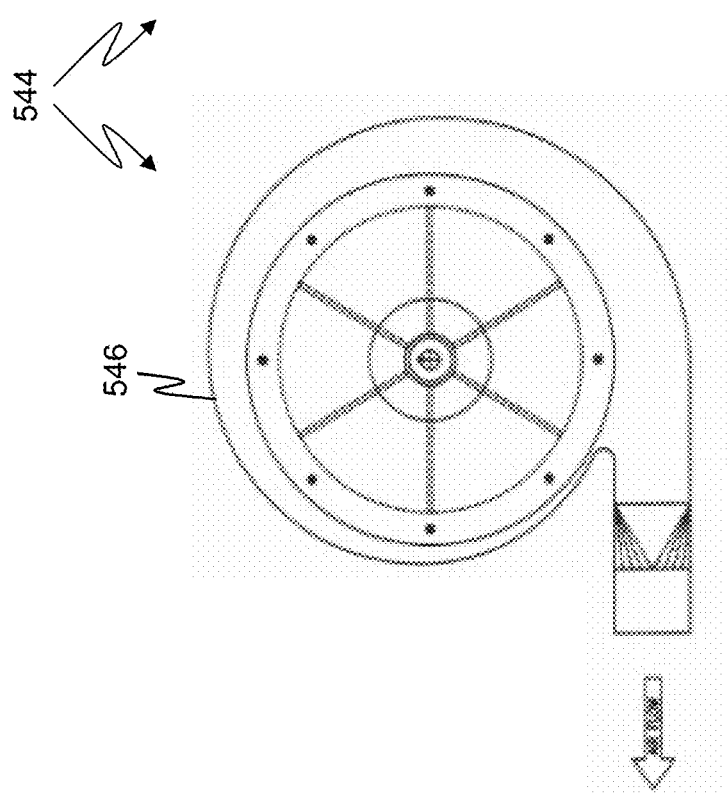
FIG. 10A is a front sectional view of one embodiment a pump for use with the scum removal system of the present invention.
Figure 11C:
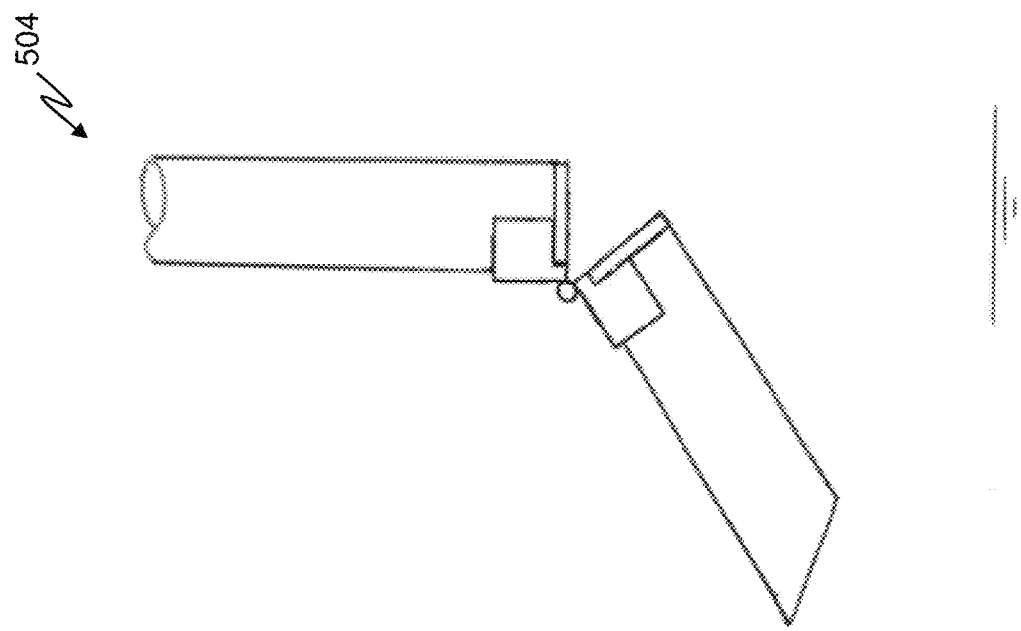
FIG. 11C is a side view of the configurable intake of FIG. 11A.
Figure 11B:
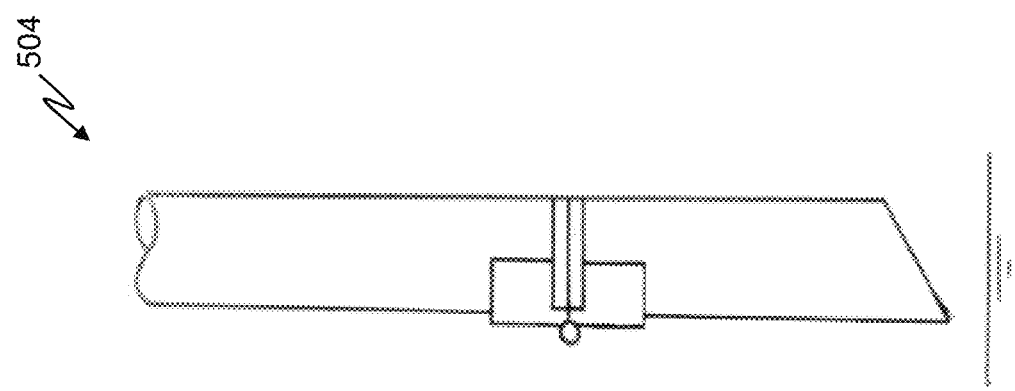
FIG. 11B is a side view of the configurable intake of FIG. 11A.
Figure 11A:
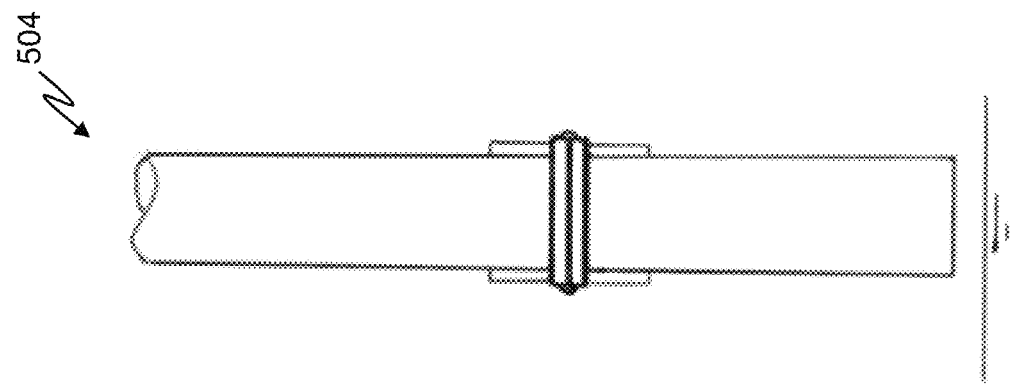
FIG. 11A is a front view of a configurable intake for use with the scum removal system of the present invention, in accordance with one embodiment of the invention.

Referring to FIG. 5 and FIG. 6, it should be appreciated that in accordance with another embodiment of the invention, a scum removal system 400 is provided for collecting floating materials from a quiescent liquid surface 402 by the employment of a pump article 404 that may be located within a cabinet 406 (enclosed or open) that may be mounted on a stand 408 (or mounted in another configuration). The pump article 404 may be installed at sufficient height PH to allow intake piping 410 to be configured to have an upward slope angle β with little or no sags or dips in between, such that a vacuum is created that is sufficient to draw material through an intake 412, into the pump article 404 that may be located inside the cabinet 406 and discharged via outlet piping 414 which is configured to have a downward slope angle Ω with little or no sags or dips. Scum and other floating debris may be vacuumed from the wastewater surface through the opening of the intake piping 410 which may have a hinged or otherwise movable intake structure 416. Debris then flows via a negative pressure, upwardly through the intake pipe 410 and into the pump article 404. Debris is then discharged via the downward sloping discharge piping 414. In one embodiment the pump cabinet 406 may be fully enclosed with a plate steel floor and plate steel shelf upon which the pump article 404 may sit.

Additionally, in one embodiment of the invention, a secondary feed pump 418 and a material container 420 may be included, wherein the secondary feed pump 418 may pump chlorine bleach or other suitable chemicals/solutions contained within the material container 420 into the discharge piping 414 to neutralize bacteria which may degrade the performance of the clarifier. Furthermore, flush water maybe used to convey, or encourage, the flow of debris (as well as the breaking up any clogs) through the discharge pipe 414 through a solenoid valve and fitting 422 to minimize plugging of the existing scum collection equipment. It should be appreciated that pump article 404, secondary feed pump 418, and the opening and closing of the solenoid valve/flush water fitting 422 may be controlled by a processing device/control panel 424. Moreover, it should be appreciated that the processing device/control panel 424 can be programmed such that the pump article 404 operates on a timer. For example, the pump article 404 may be programmed for one hour of operation every four hours. It should further be appreciated that the processing device/control panel 424 may include a soft starter and/or a variable frequency drive. It is contemplated that in at least one embodiment, a 20 amp 110V power supply may be included and configured to operate all or some of the equipment: processing device/control panel 424, pump article 404, secondary feed pump 418, and/or flush water solenoid valve 422. It should be appreciated that the scum removal system 100, 200, 300, 400 may be used to remove material from any type of clarifier system (such as a circular clarifier) or any other quiescent liquid surface as desired.

Referring to FIG. 7 through FIG. 11C, a conventional circular clarifier 500 having a walkway 502 and a scum removal system 100, 200, 300, 400 is shown having intake piping 504 mounted on the walkway 502. The circular clarifier 500 includes mechanical sludge collection equipment and scum skimming equipment 508. Sludge rake arms 512 are shown, wherein the sludge rake arms 512 includes sludge plow blades 514 angled at 45°, a scum skimmer 508 supported from the sludge rake arm 512, and a scum trough 518 next to a circular scum baffle 520 which runs the full length of the periphery of the clarifier 500 along an effluent channel 522. The sludge rake arms 512 turn slowly around the center of the tank in the direction of the arrows and are supported from a central drive unit 524. The sludge plow blades 514 move the bottom sludge towards the center of the tank and the scum skimming blade 508 moves floating scum towards the scum trough 518 at the periphery of the clarifier 500. The center drive unit 524 is connected with a concrete outer tank wall 526 by a steel access walkway 502. The walkway 502 may be supported by a center inlet baffle 528 that discharges into a circular center well 530 that is held in place by structural supports 532 that typically extend above the water line 534. Outlet ports 536 allow the flow of scum out of (and into) the center well 530.

It should be appreciated that in one embodiment a cabinet 538 and stand 540 are mounted at ground level alongside the exterior wall of the clarifier 500 at the end of the walkway 502. The intake piping 504 is mounted to the walkway 502 and extends to the center well 530 of the clarifier 500 at which point a hinged intake structure 600 is vertically mounted such that it extends to approximately one-inch above the wastewater surface 534. Discharge piping 542 extends over the wall of the clarifier 500 to the scum trough 518 where the vacuumed materials (and flush water and chemicals, if any) are deposited. It should be appreciated that any pump article 544 suitable to the desired end purpose may be used and that the pump housing 546 of the scum pump article 544 may be configured to discharge at the bottom left as shown, or in any orientation as desired. It should further be appreciated that any type of pump suitable to the desired end purpose may be used. For example, referring to FIG. 10A, FIG. 10B and again to FIG. 4 a rotary lobe positive displacement blower may be used wherein the centrifugal pump may include a 2-inch inlet 304, a 3-inch discharge connection 306 and a 2 HP, single phase, 60 Hertz, 110V, 3600 RPM direct drive motor 302. It should be appreciated that the scum pump 300 can be configured to operate with other voltages, phases, and frequencies.

Referring again to FIG. 11A, FIG. 11B and FIG. 11C one embodiment of a configurable intake piping 504 is shown and may be constructed from any material suitable to the desired end purpose and may be of any diameter that is large enough to provide sufficient cross sectional area for the passage of the materials to be removed from the liquid surface and of diameter small enough to provide for sufficient air velocity to lift floating material from the liquid surface and pull it through the intake piping 504. It should further be appreciated that the intake 504 can be solid, hinged, or otherwise configured to swing or move out of the way of structures such as center ring structural supports. For example, in one embodiment, the intake 504 may be comprised of two, 2-inch diameter round stainless steel pipes with a hinge and hinge bracket welded to the upper pipe and lower pipe. Gaskets may be provided and affixed to the ends of pipes to provide a seal when the hinge is in its normal closed position.

It should be appreciated that the scum removal system 100, 200, 300, 400 of the present invention may include monitoring articles as well to monitor the flow of debris through the system intake and system discharge. This would advantageously allow an operator to identify whether the scum removal system 100, 200, 300, 400 is clogged. If a clog is detected, the solenoid valve and fitting 422 can be automatically and/or manually operated flush the discharge piping. Additionally, it is contemplated that the pump article 202, 302, 404, 544 may be configurable to adjust the suction generated at the intake piping depending on the amount of debris present, the angle of the intake pipe 208, 308, 410 and/or the distance of the intake pipe first opening 212, 312 from the surface of the wastewater. Moreover, it is also contemplated that the scum removal system 100, 200, 300, 400 may include an adjustable positive pressure at the discharge opening.

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. Moreover, all of the information contained herein may be combined together (individually or wholly) or taken singly, as desired, to achieve varying embodiments of the invention and to add to the scope of the invention without limiting the invention to a particular embodiment. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims and/or information. Moreover, unless specifically stated any use of the terms first, second, etc. do not denote any order or importance, but rather the terms first, second, etc. are used to distinguish one element from another.

We claim:

1. A scum removal system for use with a wastewater treatment clarification tank having a center well and containing wastewater, wherein the wastewater includes a wastewater surface having floating debris, the scum removal system comprising:
    a debris intake conduit, wherein the debris intake conduit defines a first intake opening, a second intake opening located proximate the wastewater surface within the center well and an intake conduit cavity, wherein the first intake opening is communicated with the second intake opening via the intake conduit cavity,
    a debris discharge conduit, wherein the debris discharge conduit defines a first discharge opening, a second discharge opening and a discharge conduit cavity, wherein the first discharge opening is communicated with the second discharge opening via the discharge conduit cavity,
    a flushing system in flow communication with at least one of the debris intake conduit and the debris discharge conduit, and
    a pump article, wherein the pump article includes a pump intake port in flow communication with the debris intake conduit and a pump discharge port in flow communication with the debris discharge conduit,
    wherein the pump article and debris intake conduit are configured to generate a suction at the first intake opening and wherein the debris intake conduit is configured so that the second intake opening is located proximate the wastewater surface,
    wherein the second intake opening is located at a height that is lower than the pump article such that at least a portion of the debris intake conduit is sloped at a debris intake conduit angle β between the pump article and the second intake opening, and
    wherein the second discharge opening is located at a height that is lower than the pump article such that at least a portion of the debris discharge conduit is sloped at a debris discharge conduit angle Ω between the pump article and the second discharge opening.

2. The scum removal system of claim 1, wherein the debris intake conduit angle β is between about 10 degrees and about 90 degrees.

3. The scum removal system of claim 1, wherein the debris discharge conduit angle Ω is between about 10 degrees and about 90 degrees.

4. The scum removal system of claim 1, further comprising an enclosure configured to contain the pump article.

5. The scum removal system of claim 4, wherein the enclosure includes at least one of a processing device, a temperature sensing device and an exhaust system, wherein the processing device is in signal communication with at least one of the temperature sensing device, the exhaust system and the flushing system.

6. The scum removal system of claim 5, wherein the processing device is configured to receive a signal from at least one of the temperature sensing device, the exhaust system and the flushing system and operate at least one of the exhaust system and the flushing system responsive to the signal.

7. The scum removal system of claim 1, further comprising a solution container, a secondary pump article and a solution output conduit,
    wherein the solution output conduit is in flow communication with the secondary pump article and
    wherein the secondary pump article is associated with the solution container, such that when operated, the secondary pump article pumps solution contained within the solution container out of the solution output conduit.

8. The scum removal system of claim 7, wherein the solution output conduit is in further flow communication with at least one of the debris intake conduit and the debris discharge conduit such that when the secondary pump article is operated, the solution is introduced into at least one of the debris intake conduit and the debris discharge conduit.

9. The scum removal system of claim 1, wherein the clarification tank is a circular clarification tank having the center well.

10. A scum removal system for use with a wastewater treatment circular clarification tank having a center well and containing wastewater, the scum removal system comprising:
    a debris intake conduit,
    a debris discharge conduit,
    a flushing system, and
    a pump article, wherein the pump article is in flow communication with the debris intake conduit and the debris discharge conduit,
    wherein the pump article and debris intake conduit are configured to generate a suction within the debris intake conduit and wherein the debris intake conduit is configured to be located proximate the wastewater, wherein the debris intake conduit is sloped downwardly at a debris intake conduit angle β, and wherein the debris discharge conduit is sloped downwardly at a debris discharge conduit angle Ω.

11. The scum removal system of claim 10, wherein the wastewater includes a wastewater surface having floating debris and wherein the debris intake conduit is configured to be located proximate the wastewater surface.

12. The scum removal system of claim 10, wherein the debris intake conduit angle β is between about 10 degrees and about 90 degrees.

13. The scum removal system of claim 10, wherein the debris discharge conduit angle Ω is between about 10 degrees and about 90 degrees.

14. The scum removal system of claim 10, wherein the flushing system is in flow communication with at least one of the debris intake conduit and the debris discharge conduit.

15. The scum removal system of claim 10, further comprising an enclosure configured to contain the pump article.

16. The scum removal system of claim 15, wherein the enclosure includes at least one of a processing device, a temperature sensing device and an exhaust system, wherein the processing device is in signal communication with at least one of the temperature sensing device, the exhaust system and the flushing system.

17. The scum removal system of claim 16, wherein the processing device is configured to receive a signal from at least one of the temperature sensing device, the exhaust system and the flushing system and operate at least one of the exhaust system and the flushing system responsive to the signal.

18. The scum removal system of claim 10, further comprising a solution container, a secondary pump article and a solution output conduit, wherein the solution output conduit is in flow communication with the secondary pump article and wherein the secondary pump article is associated with the solution container, such that when operated, the secondary pump article pumps solution contained within the solution container out of the solution output conduit.

19. The scum removal system of claim 18, wherein the solution output conduit is in further flow communication with at least one of the debris intake conduit and the debris discharge conduit such that when the secondary pump article is operated, the solution is introduced into at least one of the debris intake conduit and the debris discharge conduit.

* * * * *